United States Patent
Aspell et al.

(10) Patent No.: US 11,531,232 B2
(45) Date of Patent: Dec. 20, 2022

(54) OPTICAL FILM FOR BACK LIGHT UNIT AND BACK LIGHT UNIT INCLUDING SAME

(71) Applicant: BrightView Technologies, Inc., Durham, NC (US)

(72) Inventors: Jennifer Aspell, Durham, NC (US); Thomas A. Rinehart, Durham, NC (US); Bing Shen, Cary, NC (US); Kenneth L. Walker, Durham, NC (US)

(73) Assignee: BrightView Technologies, Inc.

( * ) Notice: Subject to any disclaimer, the term of this patent is extended or adjusted under 35 U.S.C. 154(b) by 0 days.

(21) Appl. No.: 17/155,393

(22) Filed: Jan. 22, 2021

(65) Prior Publication Data

US 2021/0232004 A1    Jul. 29, 2021

Related U.S. Application Data

(60) Provisional application No. 63/051,101, filed on Jul. 13, 2020, provisional application No. 62/965,410, filed on Jan. 24, 2020.

(51) Int. Cl.
  *G02F 1/00* (2006.01)
  *G02F 1/13357* (2006.01)
  *G02F 1/1335* (2006.01)

(52) U.S. Cl.
  CPC .. *G02F 1/133603* (2013.01); *G02F 1/133607* (2021.01)

(58) Field of Classification Search
  CPC ............... G02B 6/0025; G02B 6/0016; G02F 1/133603; G02F 1/04; G02F 1/05;
  (Continued)

(56) References Cited

U.S. PATENT DOCUMENTS

| | | | | |
|---|---|---|---|---|
| 7,190,387 B2 * | 3/2007 | Rinehart | ............. | G02B 5/1857 355/18 |
| 7,192,692 B2 * | 3/2007 | Wood | .................. | G02B 3/0031 430/320 |

(Continued)

FOREIGN PATENT DOCUMENTS

| | | |
|---|---|---|
| JP | 2011-150077 A | 8/2011 |
| JP | 2012-018880 A | 1/2012 |

(Continued)

OTHER PUBLICATIONS

"Notification of Transmittal of the International Search Report and the Written Opinion of the International Searching Authority, or the Declaration" for International Patent Application No. PCT/US2021/014502, dated May 13, 2021, 9, pages, ISA/KR, Korean Intellectual Property Office, Daejeon, Republic of Korea.

(Continued)

*Primary Examiner* — Gerald J Sufleta, II
(74) *Attorney, Agent, or Firm* — Rauschenbach Patent Law Group, LLC; Kurt Rauschenbach

(57) ABSTRACT

An optical film for a back light unit that includes an array of light emitting diodes. The optical film includes a substrate, and a plurality of regions of spatially modulated microstructures on at least one side of the substrate. The spatially modulated microstructures have different sizes and/or shapes configured to create a gradient structure within each region. The gradient structure within each region is constructed and arranged to cause more spreading of light when positioned directly above an individual light emitting diode and less spreading of light at locations not directly above an individual light emitting diode. Within the back light unit, the gradient structure converts light beams emitted by the respective light emitting diode at different angles into a more (Continued)

uniform and higher on-axis luminance upon exiting the back light unit.

15 Claims, 15 Drawing Sheets

(58) Field of Classification Search
CPC ..... G02F 1/06; G02F 1/07; G02F 1/08; G02F 1/09; G02F 1/11; G02F 1/12; G02F 1/13
See application file for complete search history.

(56) References Cited

U.S. PATENT DOCUMENTS

| | | | | |
|---|---|---|---|---|
| 7,867,695 | B2* | 1/2011 | Freese | G03F 7/2053 |
| | | | | 347/225 |
| 8,829,784 | B2* | 9/2014 | Inoue | H01L 51/5275 |
| | | | | 313/504 |
| 8,974,069 | B2 | 3/2015 | Purchase et al. | |
| 2003/0090804 | A1 | 5/2003 | Kotchick | |
| 2005/0265029 | A1* | 12/2005 | Epstein | G09F 9/3026 |
| | | | | 362/339 |
| 2007/0097709 | A1* | 5/2007 | Hsieh | G02B 6/0038 |
| | | | | 362/620 |
| 2009/0080220 | A1* | 3/2009 | Chang | G02B 5/124 |
| | | | | 362/620 |
| 2009/0290218 | A1* | 11/2009 | Parker | F21V 5/00 |
| | | | | 359/580 |
| 2010/0039808 | A1* | 2/2010 | Purchase | G02F 1/133604 |
| | | | | 362/235 |
| 2013/0128571 | A1* | 5/2013 | Yamazaki | F21V 5/02 |
| | | | | 362/235 |
| 2015/0377451 | A1* | 12/2015 | Yao | G02B 5/0231 |
| | | | | 349/57 |
| 2017/0031082 | A1* | 2/2017 | Song | G02B 6/0061 |
| 2019/0265549 | A1 | 8/2019 | Chen et al. | |
| 2019/0278135 | A1* | 9/2019 | Woodgate | G02F 1/133603 |
| 2020/0049877 | A1* | 2/2020 | Watanabe | G02F 1/0107 |
| 2020/0259307 | A1* | 8/2020 | Sharma | G02B 27/0961 |
| 2020/0379160 | A1* | 12/2020 | Meng | G02B 6/0043 |
| 2020/0386919 | A1* | 12/2020 | Arima | G02B 5/284 |

FOREIGN PATENT DOCUMENTS

| | | |
|---|---|---|
| KR | 10-2014-0016123 A | 2/2014 |
| WO | 2021/150813 A1 | 7/2021 |

OTHER PUBLICATIONS

International Preliminary Report on Patentability and Written Opinion received for PCT Patent Application No. PCT/US2021/014502, dated Aug. 4, 2022, 6 pages.

* cited by examiner

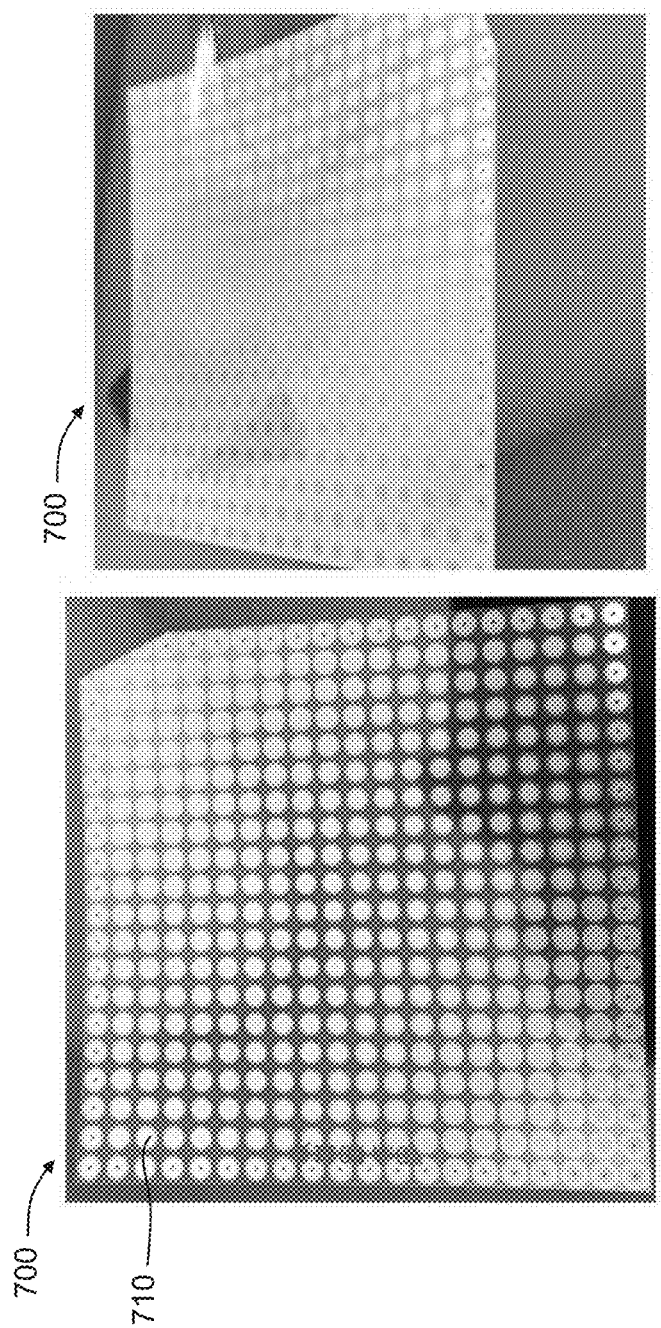

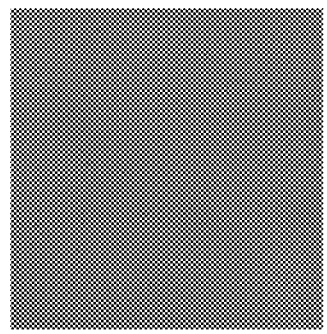
FIG. 8A
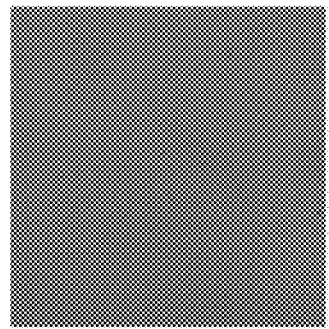
FIG. 8B
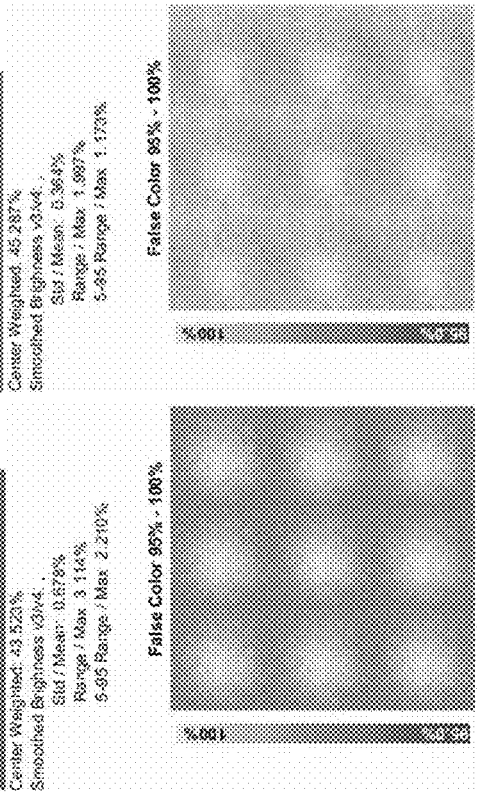
(a) Uniform MLA Film
FIG. 9A
(b) Lattice MLA Film
FIG. 9B

OPTICAL FILM FOR BACK LIGHT UNIT AND BACK LIGHT UNIT INCLUDING SAME

CROSS REFERENCE TO RELATED APPLICATION

The present application is a non-provisional application of U.S. Provisional Patent Application Ser. No. 62/965,410, entitled "Optical Film for Back Light Unit and Back Light Unit Including Same" filed on Jul. 13, 2020 and a non-provisional application of U.S. Provisional Patent Application Ser. No. 63/051,101 entitled "Optical Film for Back Light Unit and Back Light Unit Including Same" filed on Jan. 24, 2020. The entire content of U.S. Provisional Patent Application Ser. No. 62/965,410 and U.S. Provisional Patent Application Ser. No. 62/965,410 are herein incorporated by reference.

BACKGROUND

In the pursuit of improved image quality, liquid crystal displays (LCDs) are increasingly using a back light unit architecture 100, schematically illustrated in FIG. 1, that includes a printed circuit board (PCB) 110 with an array of individual short wavelength (blue) LEDs 112 bonded onto the PCB 110. The PCB 110 may have a highly reflective surface. FIGS. 2A and 2B illustrate a typical intensity distribution of light emitted from a single LED as a function of angle, as measured by a goniophotometer. As illustrated, the LED source approximates a Lambertian source that emits a substantially symmetrical light distribution relative to the nadir, with the highest intensity of light at the nadir.

Returning to FIG. 1, a series of films may be used to spread or diffuse the light emitted from the LEDs 112 so that the back light unit 100 may deliver a more uniform light to the LCD panel (not shown) containing the liquid crystals located above the back light unit 100. As illustrated, the back light unit 100 typically includes a diffuser film 120, which may be, for example, a volumetric diffuser or textured surface diffuser or a micro lens array diffuser, a color conversion layer 130 that uses either quantum dots or phosphor material, for example, to convert some of the blue light emitted by the LEDs 112 to green and red light, a diffuser film 140, which may be, for example, a volumetric diffuser or a textured surface diffuser or a micro lens array diffuser, configured to spread or diffuse the light exiting the color conversion layer 130, and two brightness enhancing films (BEFs) 150, 160, which are often two prism films rotated approximately 90 degrees relative to each other. There may be additional films in the back light unit 100 that are used to improve the overall uniformity and brightness of the light being delivered to the LCD panel. In some back light units, white LEDs may be used without a color conversion layer.

When LEDs 112 are arranged in an array, such as the 3×3 array illustrated in FIG. 3, it is desirable hide the individual LEDs 112 and present a bright and uniform light to the LCD panel. As noted above, one approach to achieving this goal is to include one or more diffusers, such as the diffuser film 120, in the back light unit 100 to diffuse, spread, or blur the beams of light emitted by the LEDs 112. FIG. 4 schematically illustrates such diffusion of the light emitted by a single LED 112, with the darker shades of grey represent a brighter light than the lighter shades of grey. Such diffusion may also reduce the mean energy of the light.

In addition, electronic devices that include LCDs are become thinner and thinner. As a result, the back light units of such displays are also becoming thinner and thinner, which presents another challenge to manage the light being emitted by the LEDs 112 in an effective manner. For example, when the diffuser film 120 is placed over the array of LEDs 112, as schematically illustrated in FIG. 5A, the individual points of light emitted by the LEDs are diffused such that light having less intensity from adjacent LED's 112 start to overlap to create areas of light with higher intensity. If the thickness of the diffuser film 120 is increased, which may be undesirable for thinner back light units, the individual points of light may be spread even further and provide better uniformity of the light, but there are still brighter and darker regions, as schematically illustrated in FIG. 5B.

It is desirable to have a back light unit for an LCD display having an array of blue LEDs and a thin profile, yet still deliver bright and uniform light to the LCD panel while effectively hiding the individual LEDs.

SUMMARY

The present invention is generally related to an optical film that may be used in a back light unit of a backlit display, particularly for backlit displays with light emitting diode (LED) light sources, as well as a back light unit that includes the optical film.

According to an embodiment of the invention, there is provided an optical film for a back light unit that includes an array of light emitting diodes. The optical film includes a substrate, and a plurality of regions of spatially modulated microstructures on at least one side of the substrate. The spatially modulated microstructures have different sizes and/or shapes configured to create a gradient structure within each region. The gradient structure within each region is constructed and arranged to cause more spreading of light when positioned directly above an individual light emitting diode and less spreading of light at locations not directly above an individual light emitting diode.

In an embodiment, the spatially modulated microstructures include a plurality of elongated prisms.

In an embodiment, the spatially modulated microstructures include a plurality of three-sided pyramids.

In an embodiment, the spatially modulated microstructures include a plurality of cones.

In an embodiment, a plurality of first regions is constructed and arranged to cause the first level of spreading of light, and each of the plurality of first regions includes a first plurality of parallel prisms oriented in a first direction on a first side of the substrate and a second plurality of parallel prisms oriented in a second direction orthogonal to the first direction on a second side of the substrate opposite the first side.

In an embodiment, the first plurality of parallel prisms and the second plurality of parallel prisms have apexes having substantially the same angles. In an embodiment, the angles are about 90°.

In an embodiment, a plurality of second regions is constructed and arranged to cause the second level of spreading of light, and each of the plurality of second regions includes the first plurality of parallel prisms oriented in the first direction on the first side of the substrate and a third plurality of parallel prisms oriented in the first direction on the second side of the substrate.

In an embodiment, a plurality of third regions is constructed and arranged to cause a third level of spreading of light, the third level being less than the first level and greater than the second level, and each of the plurality of third regions includes a gradient that includes a mixture of the second plurality of prisms and the third plurality of prisms on the second side of the substrate.

In an embodiment, a plurality of third regions surround outer perimeters of the plurality of first regions, and each of the plurality of third regions is constructed and arranged to cause a third level of spreading of light, the third level being less than the first level and greater than the second level, and each of the plurality of third regions includes a gradient that includes a fourth plurality of elongated prisms on the second side of the substrate continuously varying in angle relative to the first direction and the second direction as the positions of the fourth plurality of elongated prisms move away from the first regions so as to create a swirl-like pattern that surrounds the second plurality of elongated prisms in the first regions on the second side of the substrate.

According to an aspect of the invention, there is provided a back light unit that includes an array of light emitting diodes, and an optical film positioned above the array of light emitting diodes. The optical film includes a substrate, and a plurality of regions of spatially modulated microstructures on at least one side of the substrate. Each of the plurality of regions is positioned over a respective light emitting diode. The spatially modulated microstructures have different sizes and/or shapes configured to create a gradient structure within each region. The gradient structure within each region is constructed and arranged to convert light beams emitted by the respective light emitting diode at different angles into a more uniform and higher on-axis luminance upon exiting the back light unit.

In an embodiment, centers of the regions are positioned directly over centers of the light emitting diodes.

In an embodiment, a plurality of first regions is constructed and arranged to cause the first level of spreading of light, and each of the plurality of first regions includes a first plurality of parallel prisms oriented in a first direction on a first side of the substrate and a second plurality of parallel prisms oriented in a second direction orthogonal to the first direction on a second side of the substrate opposite the first side. Centers of the plurality of first regions are positioned directly over centers of the light emitting diodes.

In an embodiment, a plurality of second regions is constructed and arranged to cause the second level of spreading of light, and each of the plurality of second regions includes the first plurality of parallel prisms oriented in the first direction on the first side of the substrate and a third plurality of parallel prisms oriented in the first direction on the second side of the substrate. Centers of the plurality of second regions are positioned directly over areas between the light emitting diodes.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following figures are illustrated to emphasize the general principles of the present disclosure and are not necessarily drawn to scale, although at least one of the figures may be drawn to scale. Reference characters designating corresponding components are repeated as necessary throughout the figures for the sake of consistency and clarity.

FIG. 7A is a top view of an optical film in accordance with an embodiment of the invention;

FIG. 7B is a slightly more perspective view of the optical film of FIG. 7A;

FIG. 8A is a luminance image of a back light unit with optical films of the prior art having uniform microstructures;

FIG. 8B is a luminance image of the same back light unit of FIG. 8A, but with optical films according to embodiments of the invention;

FIG. 9A illustrates an optical performance analysis for the image of FIG. 8A;

FIG. 9B illustrates an optical performance analysis for the image of FIG. 8B;

DETAILED DESCRIPTION

Figure 1:
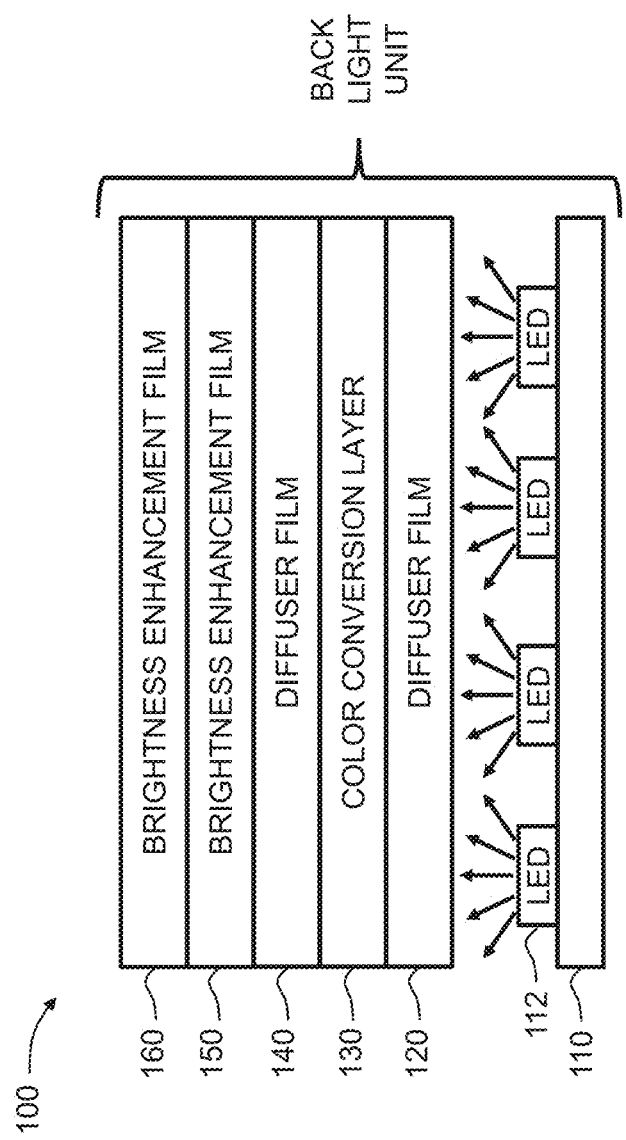
FIG. 1 is a schematic illustration of a cross-section of a typical back light unit for an LCD display that includes an array of LEDs.
Figure 2B:
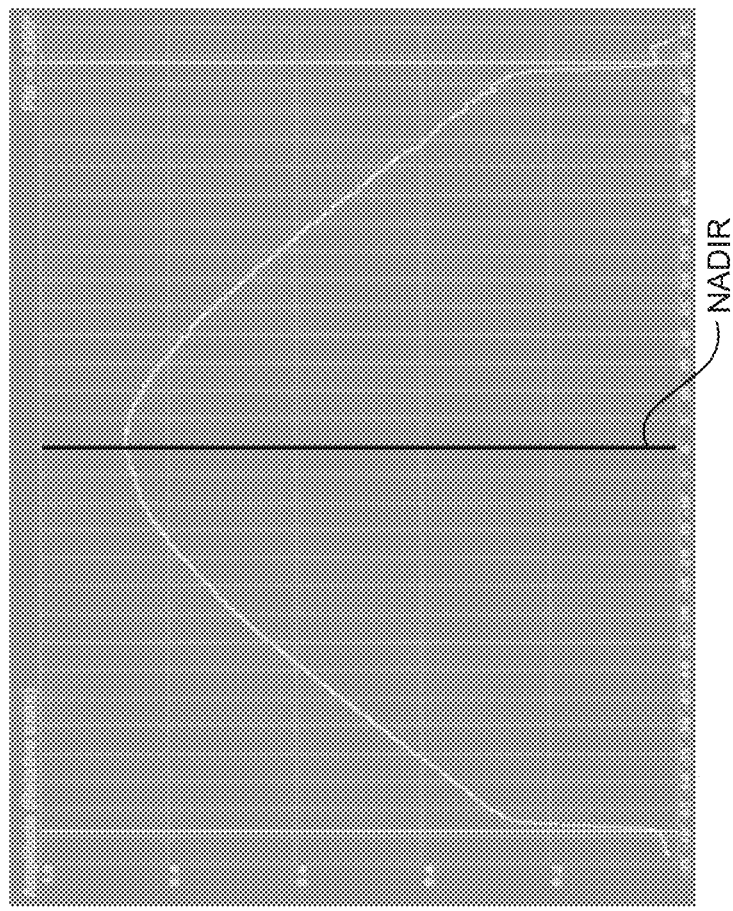
FIG. 2B is the measured light distribution of FIG. 2A represented in two dimensions.
Figure 2A:
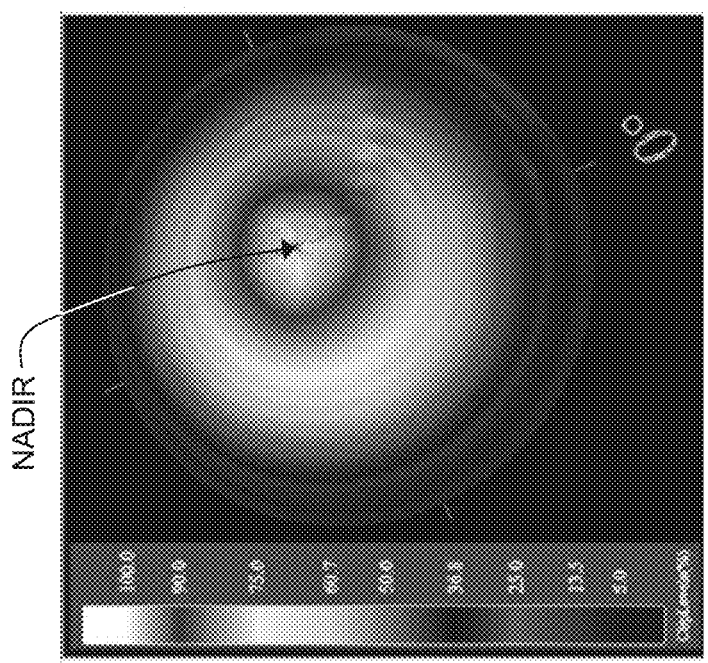
FIG. 2A is a three-dimensional plot of a distribution of light output from an LED as a function of angle, as measured by a goniophotometer.
Figure 4:
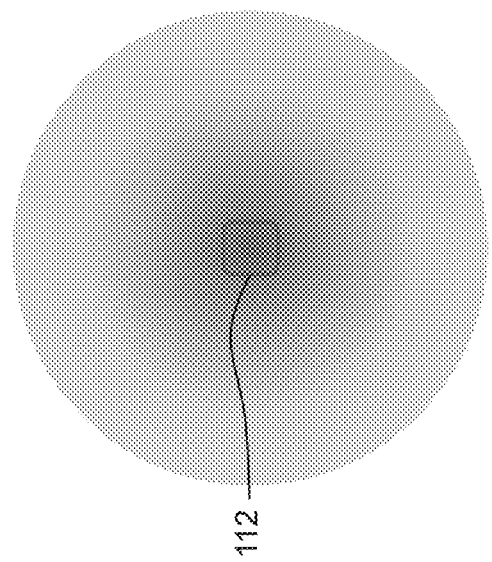
FIG. 4 is a schematic illustration of a top view of a distribution of light output from a single LED after the light has passed through a diffuser film.
Figure 3:
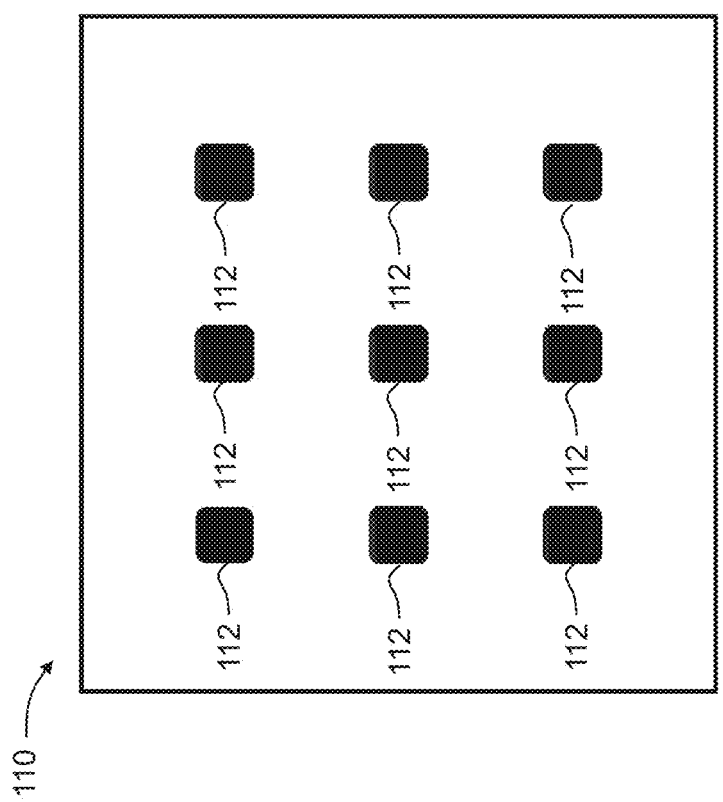
FIG. 3 is a schematic illustration of a top view of a portion of a printed circuit board with the array of LEDs of the back light unit of FIG. 1.
Figure 5B:
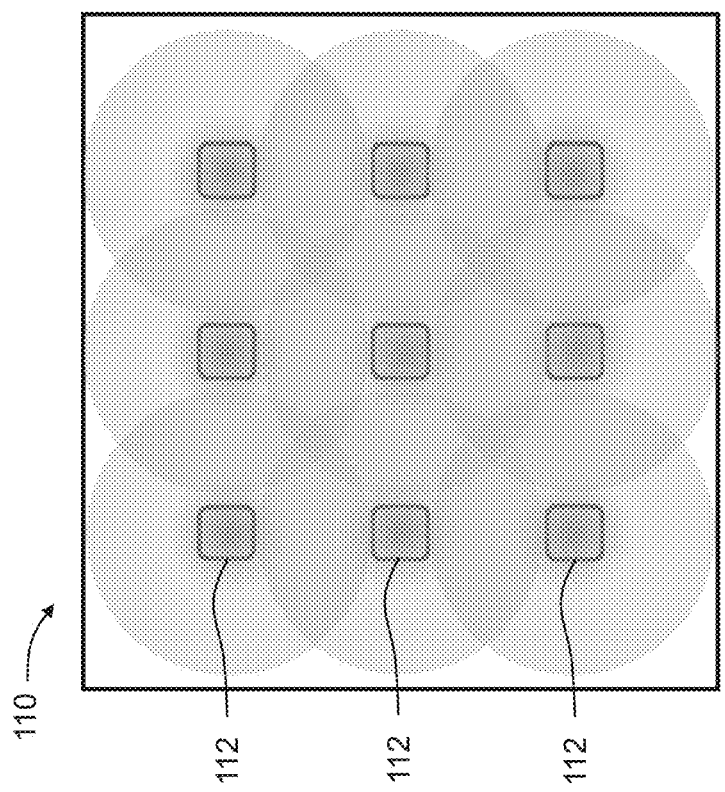
FIG. 5B is a schematic illustration of the array of LEDs of FIG. 3 after the light emitted by the LEDs has passed through a diffuser film having a thickness greater than the diffuser film used for FIG. 5A.
Figure 5A:
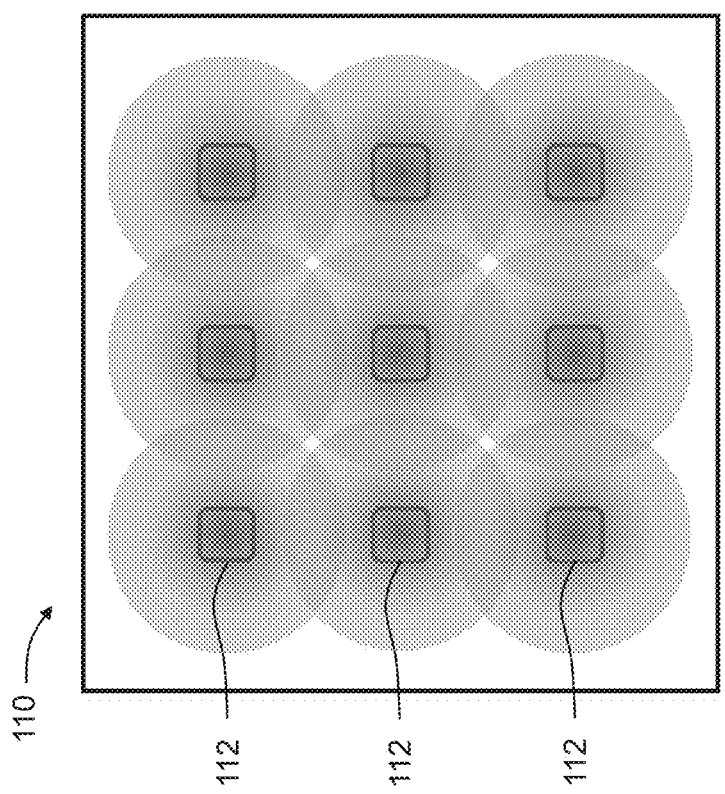
FIG. 5A is a schematic illustration of a top view of the array of LEDs of FIG. 3 after the light emitted by the LEDs has passed through the diffuser film.
Figure 6:
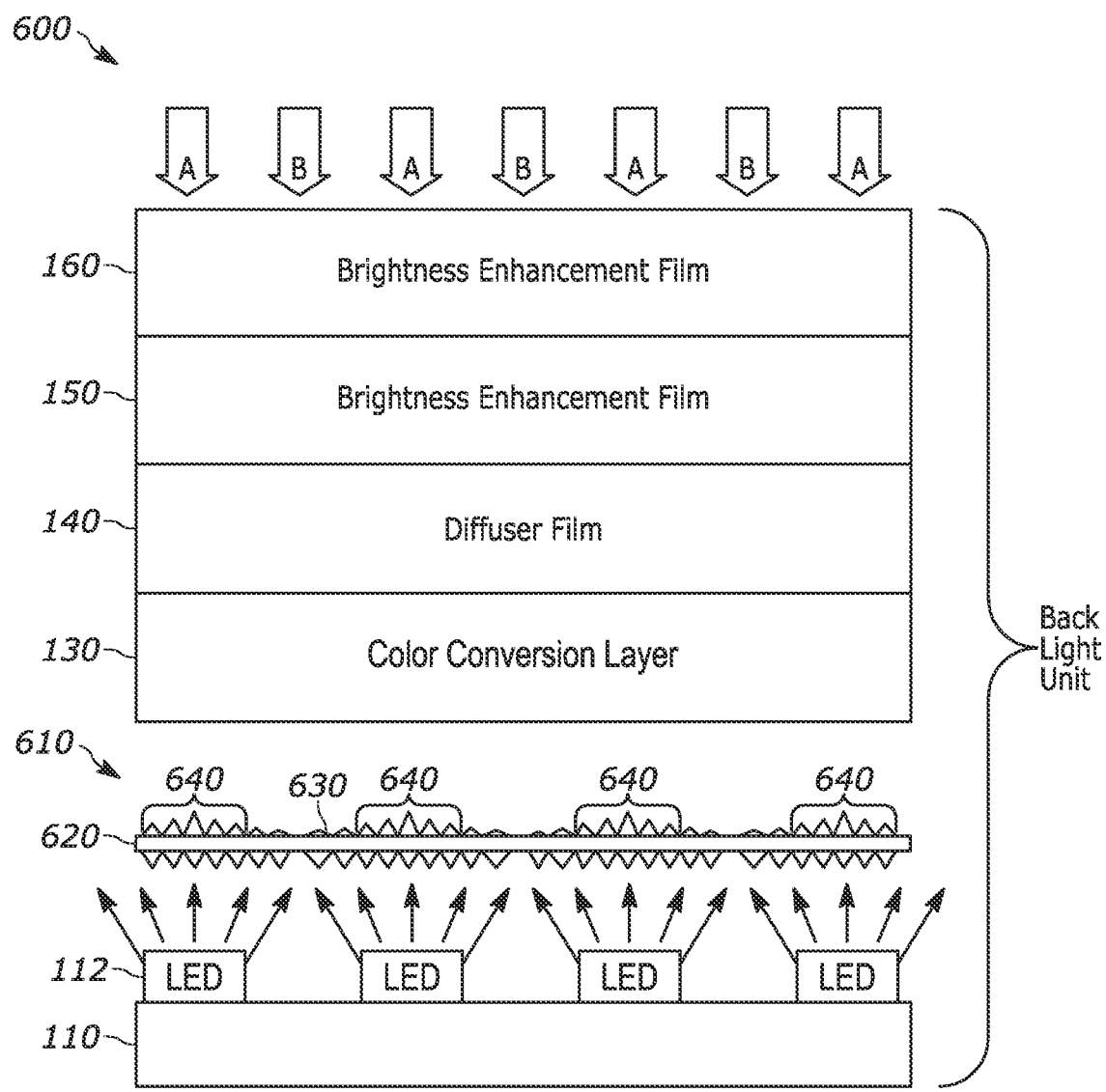
FIG. 6 is a schematic illustration of a cross-section of a back light unit for an LCD display that includes an array of LEDs and an optical film in accordance with embodiments of the invention.

FIG. 6 schematically illustrates a back light unit 600 according to embodiments of the present invention. As illustrated, the back light unit 600 includes a printed circuit board (PCB) 110 on which an array of LEDs 112 is mounted, as described above, and an optical film 610 according embodiments of the invention positioned above the array of LEDs 112 that may be used in place of or in addition to the diffuser film 120 of FIG. 1. The back light unit 600 also includes the color conversion layer 130, the diffuser film 140, and the pair of brightness enhancement films (BEFs) 150, 160 described above with respect to FIG. 1.

The angle at which light energy from an individual LED 112 impinges on the optical film 610 is highly position dependent. For example, as illustrated in FIG. 6, light beams that are received by the optical film 610 at locations "A", directly above the individual LEDs 112, have a small incidence angle, typically of less than a few degrees. Light beams that are received by the optical film 610 at locations "B", farther from the individual LEDs 112 and not directly above the individual LEDs, have much larger incident angles.

The optical film 610 includes a substrate 620 and a plurality of spatially modulated microstructures 630 on one side of a substrate 620. Although the spatially modulated microstructures 630 are illustrated as being on the side of the substrate 620 that faces away from the LEDs 112, in other embodiments, the spatially modulated microstructures 630 may be on the side of the substrate 620 that faces the LEDs 112. In an embodiment, the optical film 610 may include spatially microstructures 630 on both sides of the substrate 620. In an embodiment, the optical film 610 may include spatially modulated microstructures 630 on one side of the optical film 610 and uniform microstructures or texture on the other side of the optical film 610. In an embodiment, additional optical films 610 having spatially microstructures 630 in accordance with embodiments of the invention may be used in the back light unit 600. The illustrated embodiment is not intended to be limiting in any way.

As illustrated in FIG. 6, the optical film 610 includes a plurality of regions 640 that each include spatially modulated microstructures 630 having different sizes/shapes that are configured to create a gradient structure within each region 640. The gradient structure within a region 640 is constructed and arranged to cause more spreading of light directly above an individual LED 112 (location "A") where it is needed and less spreading of light at locations not directly above an individual LED 112 (i.e. in between individual LED 112s at location "B"), which converts the light beams emitted by the LED 112 at different angles beneath the region 640 into a more uniform and higher on-axis luminance upon exiting the back light unit 600. The centers of the regions 640, and hence gradient structure, are desirably positioned directly over a center of a respective LED 112, as illustrated.

In the embodiment illustrated in FIG. 6, the amplitude of the microstructures 630 within a region 640 is spatially varied with a maximum height profile located at a lattice point in the center of the region 640, which is located directly above the center of the LED 112. Additional parameters that can be adjusted are shapes of microstructures as a function of position, rates of structure height change, background texture between the positions of the LEDs 112, area size of constant microstructures above the LEDs 112, etc. In an embodiment, the lattice-type structure may be applied to the surface of the optical film 610 that faces the LEDs so that the microstructures may spread the beams received from the LEDs in a spatially modulated manner as well. The illustrated embodiment is not intended to be limiting in any way. All of the microstructures may be tuned to provide a smoothed distribution emanating from the top surface of the brightness enhancement film 160 of the back light unit 600.

FIGS. 7A and 7B are pictures of an optical film 700 according to an embodiment of the invention. The optical film 700 includes regions 710 of microstructures that are constructed and arranged to provide a gradient, as described above. As illustrated, the regions 710 are substantially circular in shape in plan view and together provide the optical film 710 with a lattice-type structure. The center of each region 710 is configured to be placed directly above the center of an LED.

The performance of a back light unit with the optical film 700 over an array of mini-LEDs was measured and compared to the performance of a prior art back light with a "standard" optical film with uniform microstructures (i.e. no gradient) over the identical array of mini-LEDs. FIG. 8A illustrates a Z-channel image of the light emitting from the back light unit with the standard optical film with uniform microstructures over the array of mini-LEDs, and FIG. 8B illustrates a Z-channel image of the light emitting from the back light unit with the optical film 700 according to an embodiment of the invention over the array of mini-LEDs. FIG. 9A illustrates uniformity analysis and on-axis luminance for the back light unit with the standard optical film with uniform microstructures over the array of mini-LEDs, and FIG. 9B illustrates uniformity analysis and on-axis luminance for the back light unit with the optical film 700 according to an embodiment of the invention over the array of mini-LEDs.

From the measurements, the back light unit with the optical film 700 according to an embodiment of the invention achieved an improved uniformity of 2.0%, compared with 3.1% uniformity from the back light unit with the standard optical film with uniform microstructures, thereby resulting in a 50% enhancement in uniformity. Luminance or brightness also improved by over 4% when using the optical film 700 according to an embodiment of the invention.

The microstructures 630 described above may be created using many techniques known in the art. For example, in an embodiment, the shape of the microstructure may be cast onto a substrate using a suitable master mold, and thermally-curing polymer or ultraviolet (UV) light curing polymer, or the shape may be impressed into a thermoplastic substrate through compression molding or other molding, or may be created at the same time as the substrate using extrusion-embossing or injection molding. The microstructures may be produced by replicating a master. For example, an optical film may be made by replication of a master containing the desired shapes as described in U.S. Pat. No. 7,190,387 B2 to Rinehart et al., entitled "Systems And Methods for Fabricating Optical Microstructures Using a Cylindrical Platform and a Rastered Radiation Beam"; U.S. Pat. No. 7,867,695

B2 to Freese et al., entitled "Methods for Mastering Microstructures Through a Substrate Using Negative Photoresist"; and/or U.S. Pat. No. 7,192,692 B2 to Wood et al., entitled "Methods for Fabricating Microstructures by Imaging a Radiation Sensitive Layer Sandwiched Between Outer Layers", assigned to the assignee of the present invention, the disclosures of all of which are incorporated herein by reference in their entirety as if set forth fully herein. The masters themselves may be fabricated using laser scanning techniques described in these patents and may also be replicated to provide microstructures using replicating techniques described in these patents.

In an embodiment, laser holography, known in the art, may be used to create a holographic pattern that creates the desired microstructures in a photosensitive material. In an embodiment, projection or contact photolithography, such as used in semiconductor, display, circuit board, and other common technologies known in the art, may be used to expose the microstructures into a photosensitive material. In an embodiment, laser ablation, either using a mask or using a focused and modulated laser beam, may be used to create the microstructures including the indicia in a material. In an embodiment, micromachining (also known as diamond machining), known in the art, may be used to create the desired microstructures from a solid material. In an embodiment, additive manufacturing (also known as 3D printing), known in the art, may be used to create the desired microstructure in a solid material.

Figure 10:
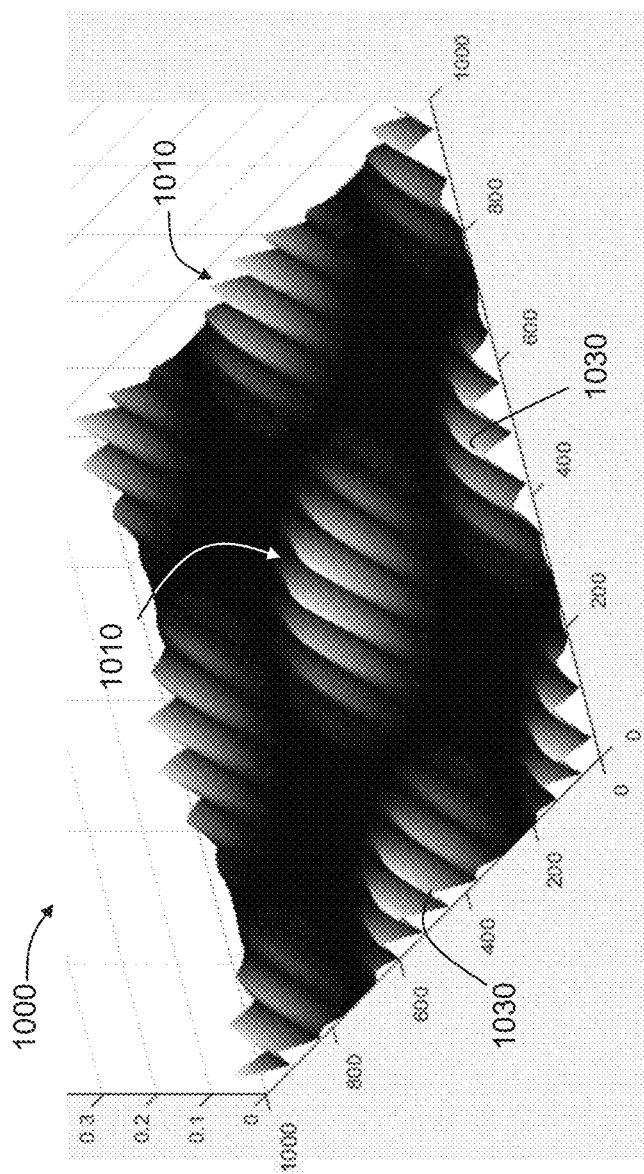
FIG. 10 is an illustration of a computer-generated model of a portion of an optical film in accordance with an embodiment of the invention.

FIGS. 10-15 illustrate different arrangements of microstructures 630 of the optical film 610 according to embodiments of the invention. As illustrated in FIG. 10, an optical film 1000 includes a plurality of regions 1010 that include microstructures in the form of elongated prisms 1030 that are sized to provide a gradient within each region 1010. The dark portions between the regions 1010 do not have microstructures.

Figure 11:
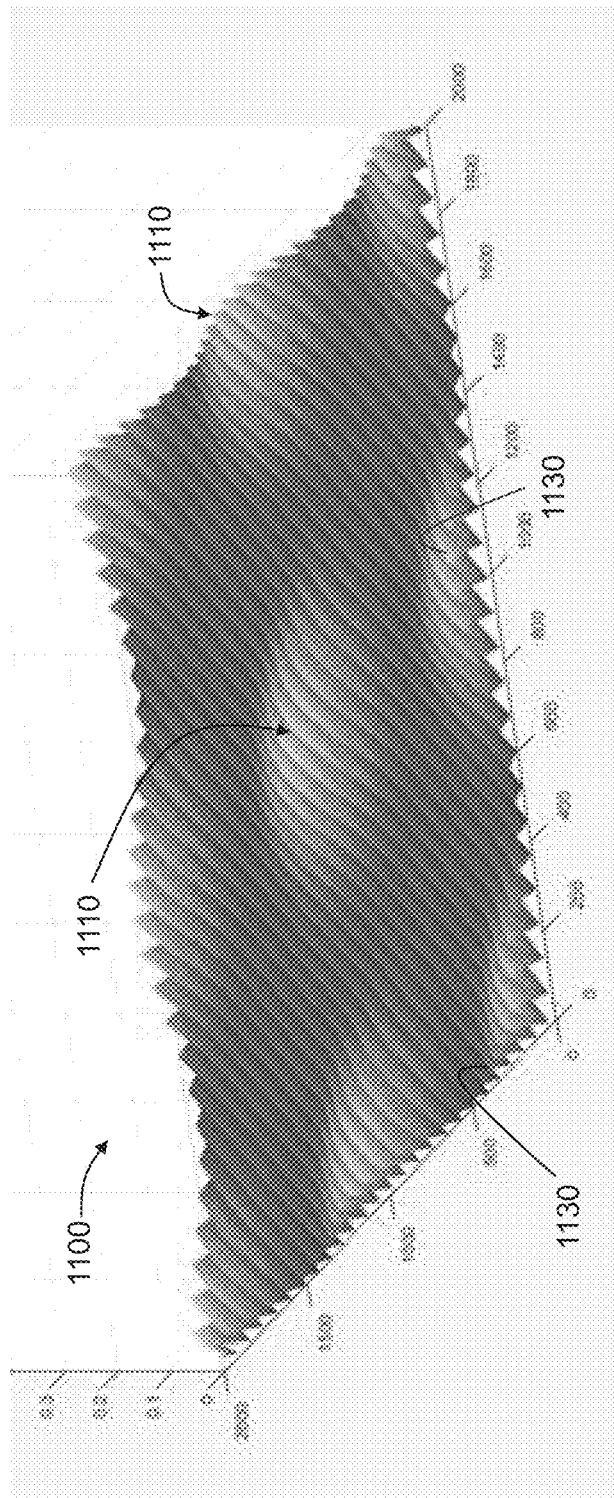
FIG. 11 is an illustration of a computer-generated model of a portion of an optical film in accordance with an embodiment of the invention.

As illustrated in FIG. 11, an optical film 1100 includes a plurality of microstructures in the form of elongated prisms 1130 that extend across the upper side of the optical film 1100. The optical film 1100 also include a plurality of regions 1110 that are sized/shaped to provide a gradient within each region 1110. The dark portions between the regions 1130 provide higher transmittance.

Figure 12:
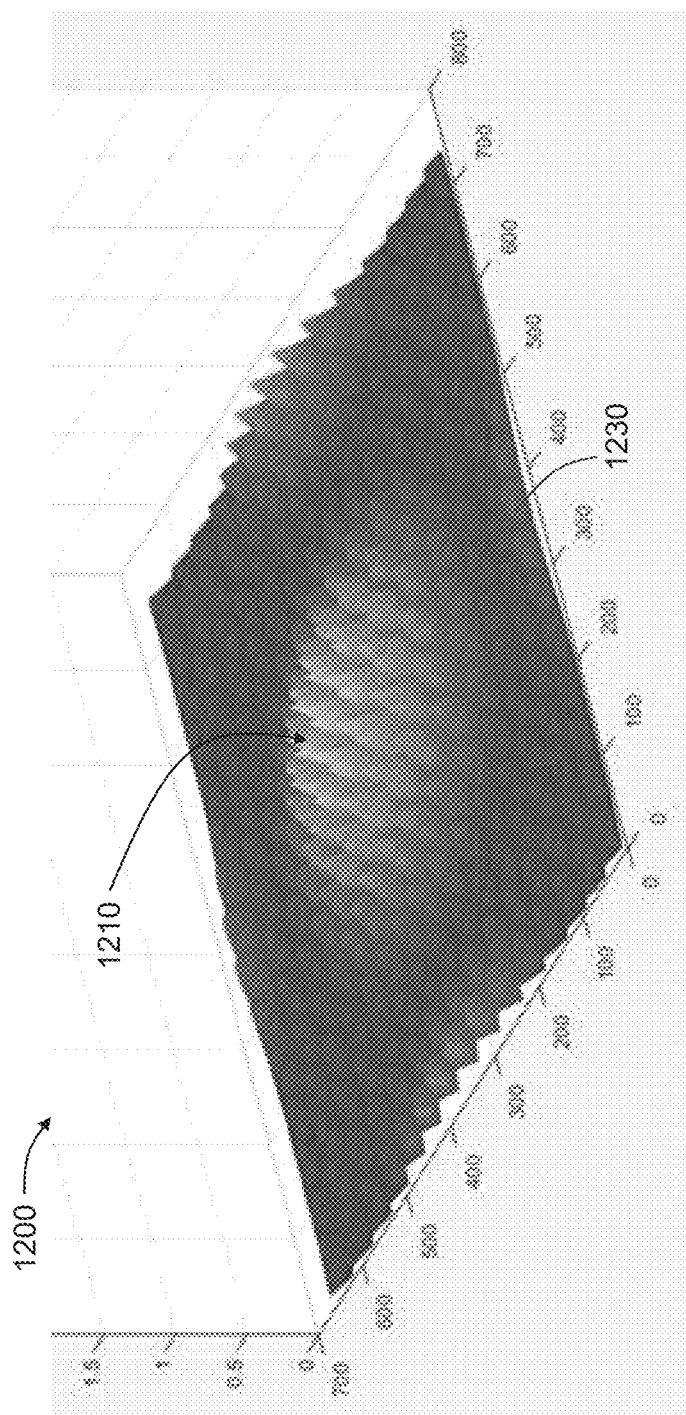
FIG. 12 is an illustration of a computer-generated model of a portion of an optical film in accordance with an embodiment of the invention.

As illustrated in FIG. 12, an optical film 1200 includes a plurality of microstructures in the form of three-sided pyramids 1230 that cover the upper side of the optical film 1200. The optical film 1200 also include a plurality of regions 1210 (only a single region 1210 shown in FIG. 12) that have the three-sided pyramids 1230 sized/shaped to provide a gradient within each region 1210. The dark portions outside of the regions 1210 provide higher transmittance.

Figure 13:
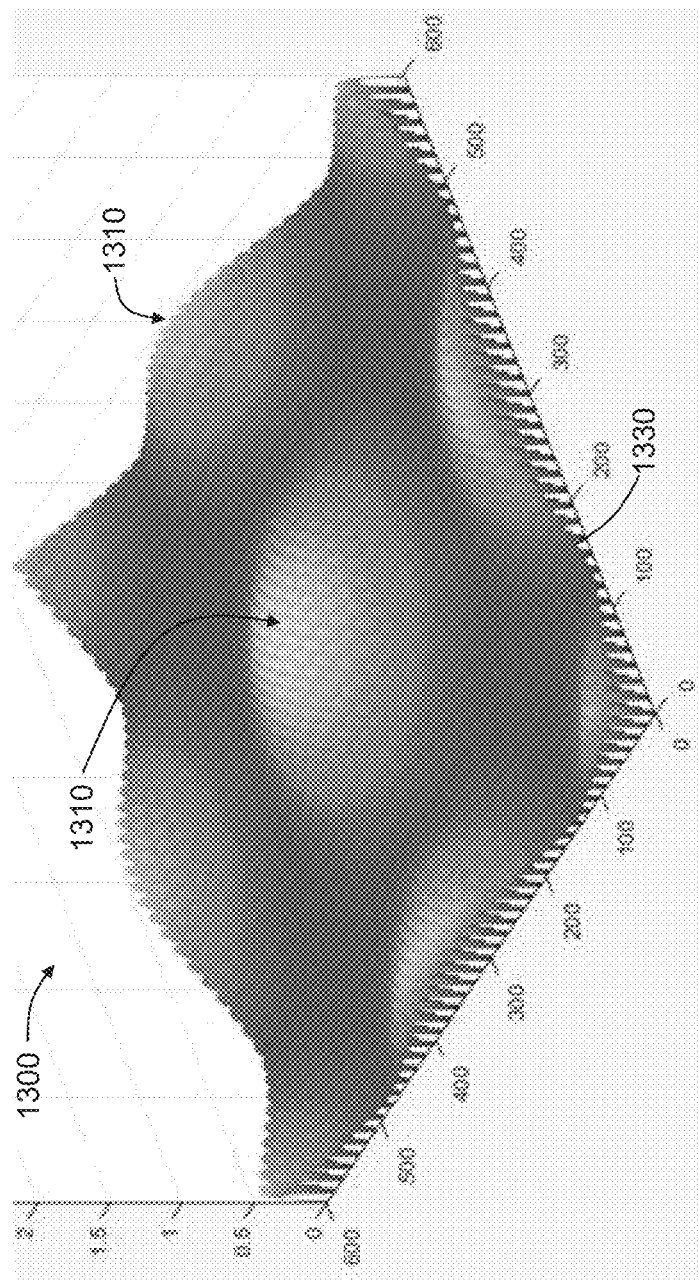
FIG. 13 is an illustration of a computer-generated model of a portion of an optical film in accordance with an embodiment of the invention.

As illustrated in FIG. 13, an optical film 1300 includes a plurality of microstructures in the form of cones 1330 that cover the upper side of the optical film 1300. The optical film 1300 also include a plurality of regions 1310 that have the cones 1330 sized/shaped to provide a gradient within each region 1310. The dark portions outside of the regions 1310 provide higher transmittance.

Figure 14:
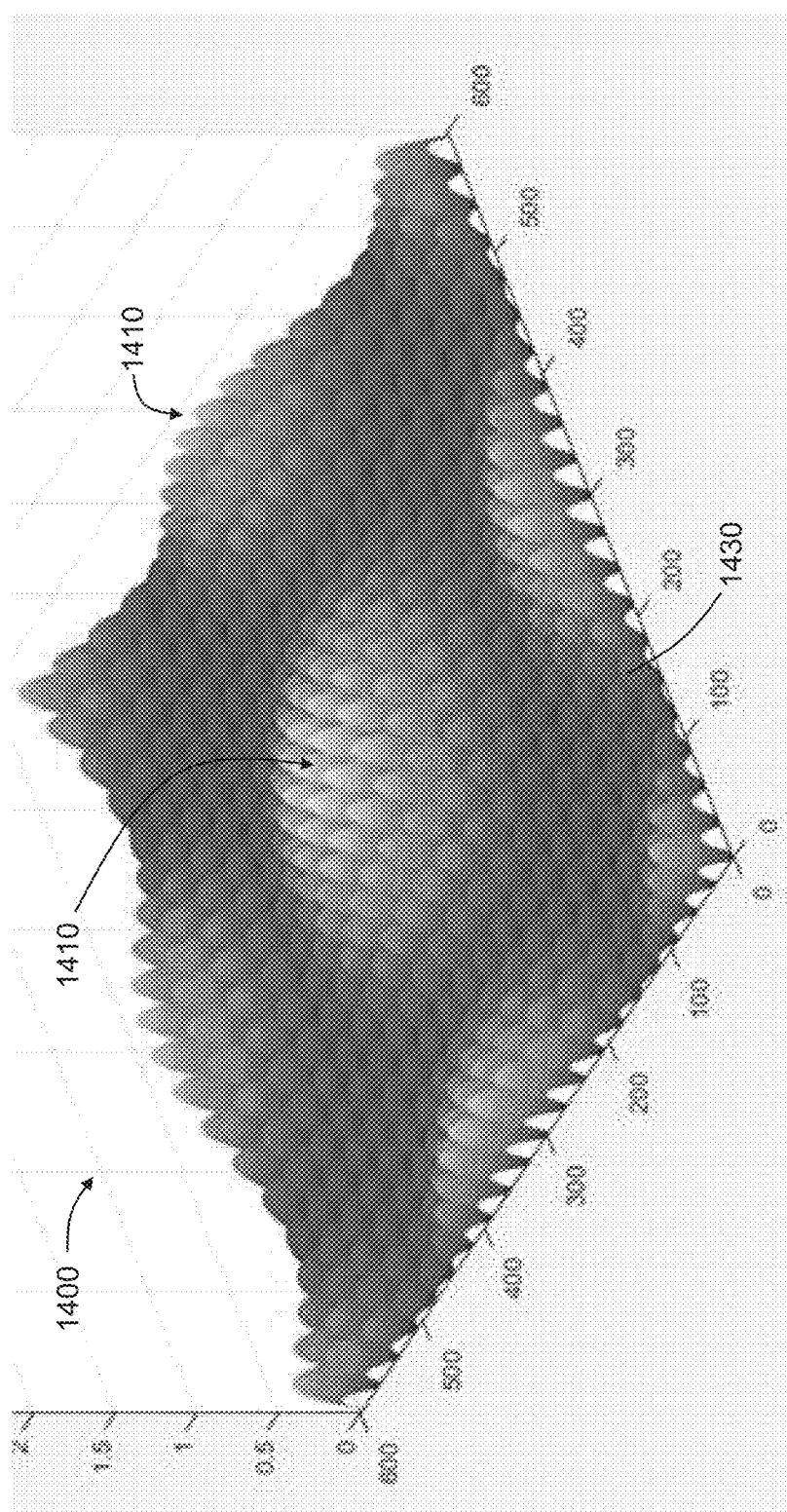
FIG. 14 is an illustration of a computer-generated model of a portion of an optical film in accordance with an embodiment of the invention.

As illustrated in FIG. 14, an optical film 1400 includes a plurality of microstructures in the form of cones 1430 that cover the upper side of the optical film 1400. The cones 1430 of the optical film 1400 of FIG. 14 are generally larger than the cones 1330 of the optical film 1300 of FIG. 13. The optical film 1400 also include a plurality of regions 1410 that have the cones 1430 sized/shaped to provide a gradient within each region 1410. The dark portions outside of the regions 1410 provide higher transmittance.

Figure 15:
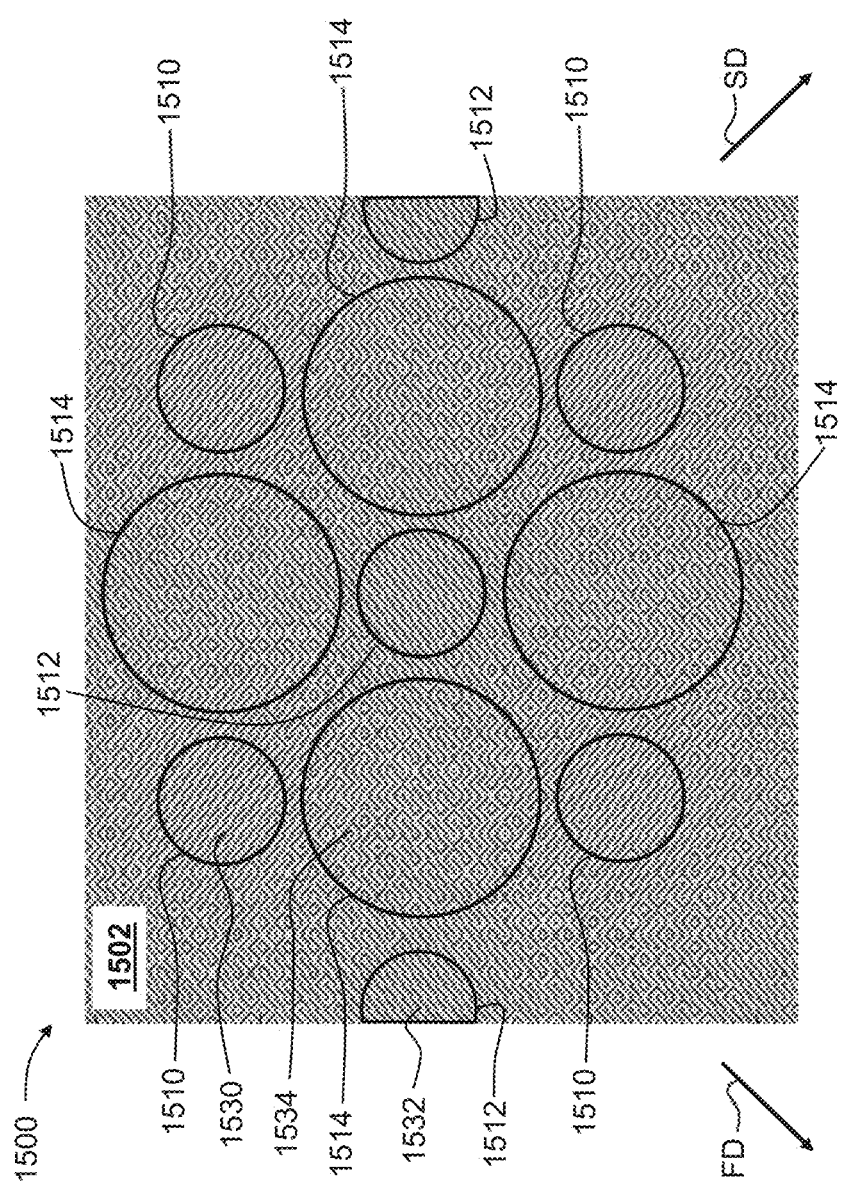
FIG. 15 is an illustration of a portion of an optical film in accordance with an embodiment of the invention.

As illustrated in FIG. 15, an optical film 1500 includes a plurality of microstructures 1530, 1532, 1534 in the form of a mixture of two or more types of lenses that cover an upper side 1502 of the optical film 1500. In an embodiment, the bottom side of the optical film 1500 (not shown) includes a plurality of microstructures in the form of elongated prisms that extend in a first direction FD. The optical film 1500 includes a plurality of first regions 1510, a plurality of second regions 1512, and a plurality of third regions 1514.

The plurality of first regions 1510 include a plurality of microstructures 1530 on the upper side 1502 of the optical film 1500 in the form of elongated prisms that extend in a second direction SD, which is orthogonal (perpendicular) to the first direction FD. The plurality of first regions 1510 are arranged to be located directly above the LEDs 612 in the back light unit 600, such as at locations "A" in FIG. 6.

The plurality of second regions 1512 include a plurality of microstructures 1532 on the upper side 1502 of the optical film 1500 in the form of elongated prisms that extend in the first direction FD and are parallel to the elongated prisms on the bottom side of the optical film 1500. The plurality of second regions 1512 are arranged to be located in between the LEDs 612 in the back light unit 600, such as at locations "B" in FIG. 6.

The plurality of third regions 1514 include a plurality of microstructures 1534 on the upper side 1502 of the optical film 1500 in the form of a mixture of prism segments that extend in the first direction FD and the second direction SD. The ratio of the two orientations of prism segments may be varied so that the plurality of third regions 1514 provide a gradient that transitions between the microstructures 1530 of the first regions 1510 and the microstructures 1532 of the second regions 1512.

The plurality of prisms on both sides of the optical film 1500 may have apex angles that are substantially similar. In an embodiment, the apex angles of the prisms may be about 90°.

Figure 16A:
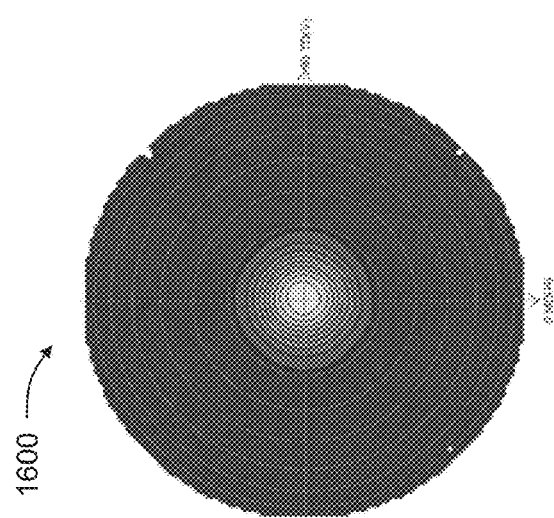
FIG. 16A is a two-dimensional plot of a distribution of light output from an LED source with a 20° beam, as measured by a goniophotometer.
Figure 16B:
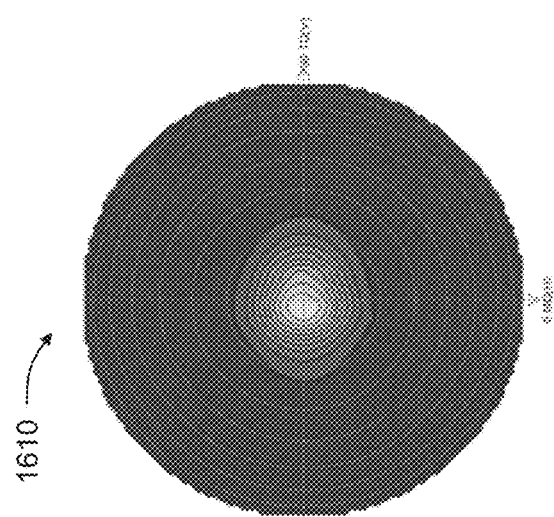
FIG. 16B is a two-dimensional plot of a distribution of light output from the LED source having the light distribution of FIG. 16A after the light has passed through an optical film having aligned prisms on front and back sides of the optical film, as measured by a goniophotometer.
Figure 16C:
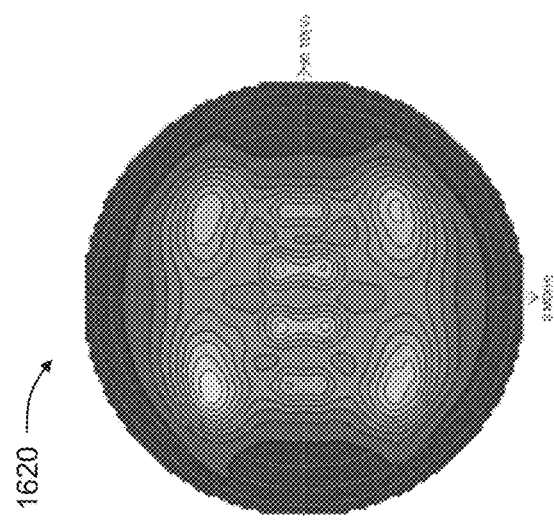
FIG. 16C is a two-dimensional plot of a distribution of light output from the LED source having the light distribution of FIG. 16A after the light has passed through an optical film, prisms on a front side of the optical film oriented orthogonal to prisms on a back side of the film, as measured by a goniophotometer.

FIGS. 16A, 16B and 16C illustrate the effect of using the two different orientations of parallel prisms for the first regions 1510 and the second regions 1512. Specifically, FIG. 16A illustrates a distribution 1600 of a ~20-degree beam emitted by an LED, as measured by a goniophotometer. FIG. 16B shows a distribution 1610 of the same beam used for FIG. 16A exiting an optical film having elongated prisms on both sides that are parallel to each other, such as in the second regions 1512 illustrated in FIG. 15. As illustrated, the beam exits the film almost unchanged with minimum angular spreading, which may be desirable for positions in between the LEDs (e.g., at locations "B" in FIG. 6). In contrast, FIG. 16C illustrates a distribution 1620 of the same beam used for FIG. 16A exiting a film with elongated prisms on both sides of the optical film, but with a relative orientation of 90 degrees to each other, such as in the first regions 1510 illustrated in FIG. 15. As illustrated, the beam exits the film with large angular spreading, which is desirable for the positions directly above the LEDs (e.g., at locations "A" in FIG. 6). The mixture of prisms located in the third regions 1514 illustrated in FIG. 15 are expected to provide for angular spreading of light in between what is provided by the prisms located in the first regions 1510 and the second regions 1512.

Figure 17:
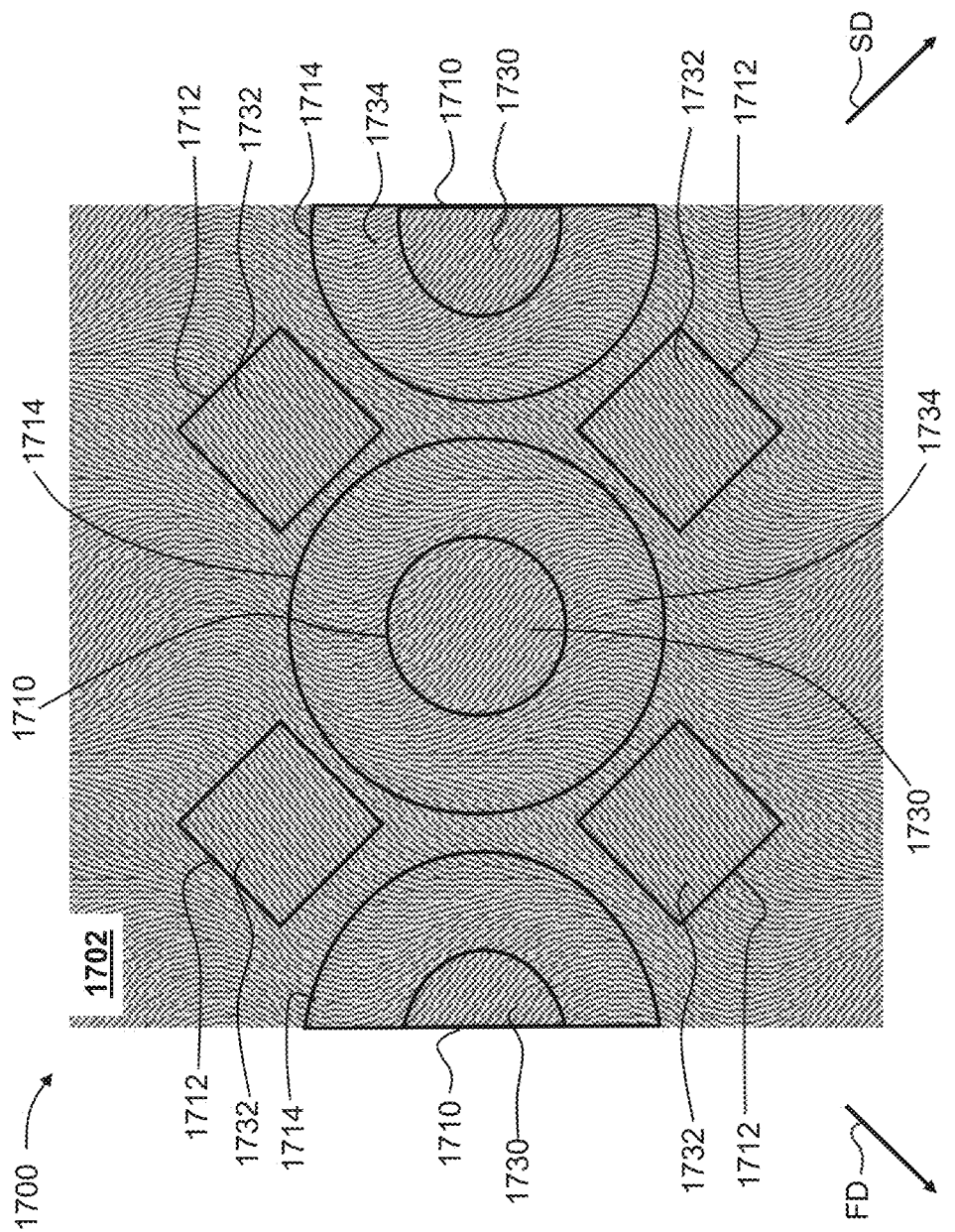
FIG. 17 is an illustration of a portion of an optical film in accordance with an embodiment of the invention.

As illustrated in FIG. 17, an optical film 1700 includes a plurality of microstructures 1730, 1732, 1734 in the form of a mixture of two or more types of lenses that cover an upper side 1702 of the optical film 1700. In an embodiment, the bottom side of the optical film 1700 (not shown) includes a plurality of microstructures in the form of elongated prisms that extend in the first direction FD. The optical film 1700 includes a plurality of first regions 1710, a plurality of second regions 1712, and a plurality of third regions 1714.

The plurality of first regions 1710 include a plurality of microstructures 1730 on the upper side 1702 of the optical film 1700 in the form of elongated prisms that extend in the second direction SD, which is orthogonal (perpendicular) to the first direction FD. The plurality of first regions 1710 are arranged to be located directly above the LEDs 612 in the back light unit 600, such as at locations "A" in FIG. 6.

The plurality of second regions 1712 include a plurality of microstructures 1732 on the upper side 1702 of the optical film 1700 in the form of elongated prisms that extend in the first direction FD and are parallel to the elongated prisms on the bottom side of the optical film 1700. The plurality of second regions 1712 are arranged to be located in between the LEDs 612 in the back light unit 600, such as at locations "B" in FIG. 6.

The plurality of third regions 1714 include a plurality of microstructures 1734 on the upper side 1702 of the optical film 1700 in the form of a mixture of prism segments that vary in angle relative to the first direction FD and the second direction SD in a continuous manner as the positions of the microstructures 1734 move away from the first regions 1710 so as to create a swirl-like pattern that surrounds the plurality of microstructures 1730 in the first regions 1710, as illustrated. Such a swirl-like pattern in the third regions 1714 provides a gradient that transitions between the microstructures 1730 of the first regions 1710 and the microstructures 1732 of the second regions 1712, as illustrated.

The plurality of prisms on both sides of the optical film 1700 may have apex angles that are substantially similar. In an embodiment, the apex angles of the prisms may be about 90°.

The illustrated embodiments of the optical films 1000, 1100, 1200, 1300, 1400, 1500, and 1700 of FIGS. 10-15 and 17 are not intended to be limiting in any way are illustrate a wide range possible microstructure shapes and sizes that may be used for the optical film 610 of FIG. 6. For example, for embodiments of optical films 610 that use elongated prisms on both sides of the substrate 620, the spreading of the light in the first regions 1510, 1710 may be varied by changing the angles at the apexes of the orthogonal prisms, with a value of about 90° providing substantial spreading.

The illustrated and above-described embodiments are not intended to be limiting in any way, and any such modifications to the embodiments described herein are intended to be included within the spirit and scope of the present disclosure and protected by the claims that follow.

What is claimed is:

1. An optical film for a back light unit comprising an array of light emitting diodes, the optical film comprising:
   a substrate; and
   a plurality of regions of spatially modulated microstructures on at least one side of the substrate, wherein at least one of the plurality of regions is positioned directly over a light emitting diode comprising the array of light emitting diodes, the gradient structure within each region being constructed and arranged to cause a first level of spreading of light when positioned directly above an individual light emitting diode and a second level of spreading of light at locations not directly above an individual light emitting diode, the second level being less that the first level, the plurality of regions of spatially modulated microstructures on at least one side of the substrate comprising a plurality of first regions constructed and arranged to cause the first level of spreading of light, and each of the plurality of first regions comprises a first plurality of parallel prisms oriented in a first direction on a first side of the substrate and a second plurality of parallel prisms oriented in a second direction orthogonal to the first direction on a second side of the substrate opposite the first side,
   the plurality of regions of spatially modulated microstructures on at least one side of the substrate further comprising a plurality of second regions constructed and arranged to cause the second level of spreading of light, and each of the plurality of second regions comprises the first plurality of parallel prisms oriented in the first direction on the first side of the substrate and a third plurality of parallel prisms oriented in the first direction on the second side of the substrate,
   the plurality of regions of spatially modulated microstructures on at least one side of the substrate further comprising a plurality of third regions that surround outer perimeters of the plurality of first regions, and each of the plurality of third regions is constructed and arranged to cause a third level of spreading of light, the third level being less than the first level and greater than the second level, and each of the plurality of third regions comprises a gradient comprising a fourth plurality of elongated prisms on the second side of the substrate continuously varying in angle relative to the first direction and the second direction as the positions of the fourth plurality of elongated prisms move away from the first regions so as to create a swirl-like pattern that surrounds the second plurality of elongated prisms in the first regions on the second side of the substrate.

2. The optical film according to claim 1, wherein the spatially modulated microstructures comprise a plurality of elongated prisms.

3. The optical film according to claim 1, wherein the spatially modulated microstructures comprise a plurality of three-sided pyramids.

4. The optical film according to claim 1, wherein the spatially modulated microstructures comprise a plurality of cones.

5. The optical film according to claim 1, wherein the first plurality of parallel prisms and the second plurality of parallel prisms have apexes having substantially the same angles.

6. The optical film according to claim 5, wherein the angles are about 90°.

7. The optical film according to claim 1, wherein a plurality of third regions is constructed and arranged to cause a third level of spreading of light, the third level being less than the first level and greater than the second level, and each of the plurality of third regions comprises a gradient comprising a mixture of the second plurality of prisms and the third plurality of prisms on the second side of the substrate.

8. A back light unit comprising:
   an array of light emitting diodes; and
   an optical film positioned above the array of light emitting diodes, the optical film comprising
   a substrate, and
   a plurality of regions of spatially modulated microstructures on at least one side of the substrate, each of the plurality of regions positioned over a respective light emitting diode, wherein at least one of the plurality of regions is positioned directly over a light emitting diode comprising the array of light emitting diodes, the gradient structure within each region being constructed and arranged to convert light beams emitted by the respective light emitting diode at different angles into a more uniform and higher on-axis luminance upon exiting the back light unit, the plurality of regions of spatially modulated microstructures on at least one side of the substrate comprising a plurality of first regions constructed and arranged to cause the first level of spreading of light, and each of the plurality of first regions comprises a first plurality of parallel prisms oriented in a first direction on a first side of the substrate and a second plurality of parallel prisms oriented in a second direction orthogonal to the first direction on a second side of the substrate opposite the first side, and wherein centers of the plurality of first regions are positioned directly over centers of the light emitting diodes, the plurality of regions of spatially modulated microstructures on at least one side of the substrate further comprising a plurality of second regions constructed and arranged to cause the second level of spreading of light, and each of the plurality of second regions comprises the first plurality of parallel prisms oriented in the first direction on the first side of the substrate and a third plurality of parallel prisms oriented in the first direction on the second side of the substrate, and wherein centers of the plurality of second regions are positioned directly over areas between the light emitting diodes, the plurality of regions of spatially modulated microstructures on at least one side of the substrate further comprising a plurality of third regions that surround outer perimeters of the plurality of first regions, and each of the plurality of third regions constructed and arranged to cause a third level of spreading of light, the third level being less than the first level and greater than the second level, and each of the plurality of third regions comprises a gradient comprising a fourth plurality of elongated prisms on the second side of the substrate continuously varying in angle relative to the first direction and the second direction as the positions of the fourth plurality of elongated prisms move away from the first regions so as to create a swirl-like pattern that surrounds the second plurality of elongated prisms in the first regions on the second side of the substrate.

9. The back light unit according to claim 8, wherein centers of the regions are positioned directly over centers of the light emitting diodes.

10. The back light unit according to claim 8, wherein the spatially modulated microstructures comprise a plurality of elongated prisms.

11. The back light unit according to claim 8, wherein the spatially modulated microstructures comprise a plurality of three-sided pyramids.

12. The back light unit according to claim 8, wherein the spatially modulated microstructures comprise a plurality of cones.

13. The back light unit according to claim 8, wherein the first plurality of parallel prisms and the second plurality of parallel prisms have apexes having substantially the same angles.

14. The back light unit according to claim 13, wherein the angles are about 90°.

15. The back light unit according to claim 8, wherein a plurality of third regions is constructed and arranged to cause a third level of spreading of light, the third level being less than the first level and greater than the second level, and each of the third plurality of regions comprises a gradient comprising a mixture of the second plurality of prisms and the third plurality of prisms on the second side of the substrate.

* * * * *